(12) United States Patent
Abson

(10) Patent No.: US 11,934,470 B2
(45) Date of Patent: *Mar. 19, 2024

(54) PROVIDING ACCESS WITH SEPARATE AUTHENTICATION TO SECURE CONTENT IN REPOSITORIES

(71) Applicant: Hyland UK Operations Limited, Maidenhead (GB)

(72) Inventor: Will Abson, Maidenhead (GB)

(73) Assignee: Hyland UK Operations Limited (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/673,280

(22) Filed: Feb. 16, 2022

(65) Prior Publication Data

US 2022/0245211 A1 Aug. 4, 2022

Related U.S. Application Data

(63) Continuation of application No. 15/406,462, filed on Jan. 13, 2017, now Pat. No. 11,281,731.

(51) Int. Cl.
| | |
|---|---|
| G06F 16/95 | (2019.01) |
| G06F 16/248 | (2019.01) |
| G06F 16/28 | (2019.01) |
| G06F 16/9535 | (2019.01) |
| H04L 9/40 | (2022.01) |

(52) U.S. Cl.
CPC ........ *G06F 16/9535* (2019.01); *G06F 16/248* (2019.01); *G06F 16/283* (2019.01); *H04L 63/0227* (2013.01); *H04L 63/0428* (2013.01); *H04L 63/067* (2013.01); *H04L 63/102* (2013.01); *H04L 63/104* (2013.01)

(58) Field of Classification Search
CPC ... G06F 16/9535; G06F 16/283; G06F 16/248
See application file for complete search history.

(56) References Cited

U.S. PATENT DOCUMENTS

| | | | |
|---|---|---|---|
| 9,418,085 B1 | 8/2016 | Shih et al. | |
| 10,504,048 B2* | 12/2019 | Beck | G06Q 10/0635 |
| 10,599,678 B2 | 3/2020 | Kapoor et al. | |
| 2004/0199517 A1 | 10/2004 | Casati et al. | |
| 2005/0273460 A1 | 12/2005 | Abrams et al. | |
| 2008/0288629 A1 | 11/2008 | Fisher, III et al. | |

(Continued)

*Primary Examiner* — Loc Tran
(74) *Attorney, Agent, or Firm* — Eschweiler & Potashnik, LLC

(57) ABSTRACT

A request from a user to access a report associated with one or more content items maintained by an electronic content management system can be received. A query, associated with the request and including one or more attributes of the request to access the report can be executed. A set of user permissions can be set. The requested report can be based on one or more results returned from the executing of the query. The requested report can include information consistent with the set of user permissions and generated to include a link to the one or more content items maintained by the electronic content management system. The analytics engine can be logically separate from the electronic content management system. A request can be received through the query to access the one or more content items. The one or more content items can then be presented to the user.

8 Claims, 8 Drawing Sheets

(56) References Cited

U.S. PATENT DOCUMENTS

| | | |
|---|---|---|
| 2009/0300043 A1 | 12/2009 | MacLennan |
| 2011/0087516 A1 | 4/2011 | Frieden et al. |
| 2011/0307603 A1 | 12/2011 | Ishikawa |
| 2012/0036109 A1* | 2/2012 | Blazejewski ......... G06F 16/258 707/661 |
| 2012/0095984 A1* | 4/2012 | Wren-Hilton ......... G06F 16/903 707/707 |
| 2013/0081056 A1 | 3/2013 | Hu et al. |
| 2015/0100582 A1 | 4/2015 | Xi et al. |
| 2015/0317361 A1 | 11/2015 | Battaglia et al. |
| 2016/0292219 A1 | 10/2016 | Prabhakar |
| 2016/0351189 A1 | 12/2016 | Miller et al. |
| 2017/0091400 A1* | 3/2017 | Richards ............. G06F 21/6263 |
| 2017/0116307 A1 | 4/2017 | Kapoor et al. |
| 2017/0142578 A1 | 5/2017 | Puri et al. |
| 2017/0193039 A1 | 7/2017 | Agrawal et al. |
| 2017/0272336 A1 | 9/2017 | Johnstone et al. |
| 2018/0137147 A1 | 5/2018 | Abson et al. |
| 2018/0196878 A1 | 7/2018 | Iball et al. |

\* cited by examiner

PROVIDING ACCESS WITH SEPARATE AUTHENTICATION TO SECURE CONTENT IN REPOSITORIES

TECHNICAL FIELD

The subject matter described herein relates generally to content management systems and to obtaining multi-dimensional reports and analytics based on data generated by events that occur on content management systems.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content (also referred to herein in some examples as "files" or "documents") that an enterprise produces or generates, retains or otherwise stores, manipulates or modifies, etc. can support the requirements of one or more of such applications, and optionally other requirements, to provide a coherent solution in which content processes, management processes, and the like are capable of accessing content across a variety of applications subject to access controls, permissions, and the like. Content managed by a CMS can include one or more of documents, images, photos, Web pages, records, XML documents, other unstructured or semi-structured files, etc. Content retained in a CMS can also include directory structures such as folders, file trees, file plans, or the like, which can provide organization for multiple content items in addition to storing or otherwise representing relationships between content item, etc. An "enterprise" can generally refer to an organization, such as for example a business or company, a foundation, a university, or the like, and can have content requirements related to one or more business processes, content uses, etc.

A CMS manages the actual digital binary content, the metadata that describes a context of each content item, associations between a content item and other content or content items, a place and classification of a content item in a repository, indexes for finding and accessing content items, etc. The CMS can also manage processes and lifecycles of content items to ensure that this information is correct. The CMS can also manage one or more workflows for capturing, storing, and distributing content, as well as the lifecycle for how long content will be retained and what happens after that retention period.

A CMS for use in enterprise content management can include one or more of document management tools, applications, and interfaces to support general office work, search, and discovery. Workflow management capabilities of a CMS can support numerous business processes, optionally including, but not limited to, case management and review and approval. Collaboration applications and services of a CMS can support the collaborative development of information and knowledge in the creation and refinement of content and documents. This collaborative development of information and knowledge can be achieved through providing access to content managed by the CMS to multiple users. To prevent conflicting or discontinuous editing streams, a user can be allowed to check out or lock content for modification and check in the modified content such that other users are prevented from editing content concurrently. Web content management services of a CMS, which can be scalable, can support the delivery and deployment of content from the enterprise to its customers. Records management capabilities of a CMS can capture and preserve records based upon government-approved or other standards. A standards-based platform can also provide access to applications that use these standards, such as publishing, image management, email management, etc.

SUMMARY

As discussed in greater detail below, features of the current subject matter can enable the seamless access of content items managed by a CMS when viewing business information and business analytics reports about the content items. Reports associated with events occurring in a CMS can be generated. The events can relate to content items managed by the CMS, the status of the CMS, Business Process Applications, activities associated with the CMS, or the like. Reports can be a product of an analytics engine. Performing analytics on events associated with the CMS can be processor-intensive and therefore, if performed by the CMS, can reduce performance of the CMS. Consequently, analytics on the CMS is typically performed by an analytics engine that is separate from the CMS. Separating the analytics engine from the CMS facilitates improved performance in both elements, but introduces barriers when a user attempts to interact with both simultaneously. Features of the current subject matter can support multi-dimensional reporting analytics of activity associated with a CMS while facilitating access to the CMS through the reports generated by an analytics engine.

In one aspect, a method includes [[to be completed based on final claims]]

Implementations of the current subject matter can include, but are not limited to, methods consistent with the descriptions provided herein as well as articles that comprise a tangibly embodied machine-readable medium operable to cause one or more machines (e.g., computers, etc.) to perform operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise software system or other content management software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
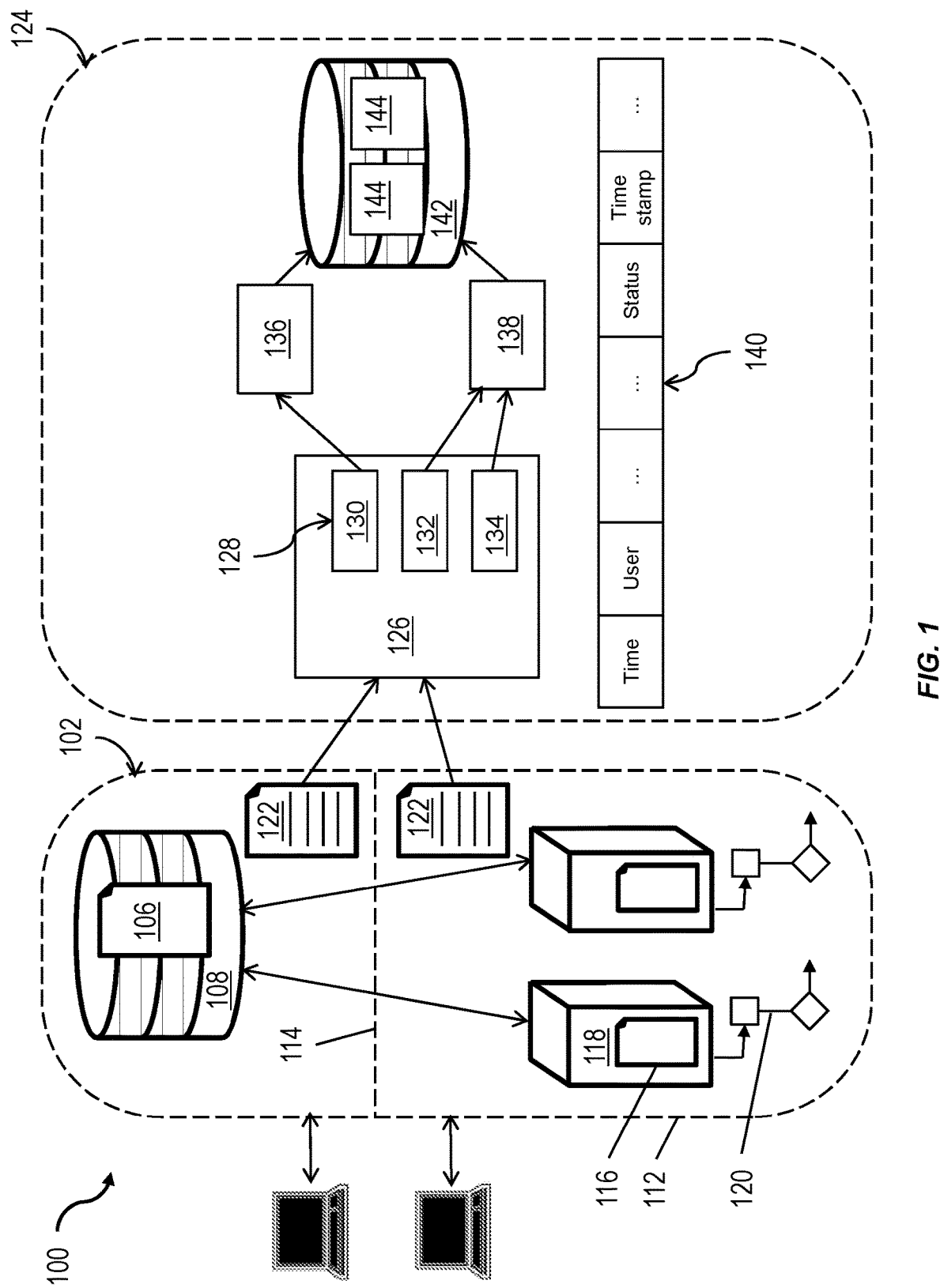
FIG. 1 shows a diagram illustrating elements of a computing architecture having one or more elements consistent with the present description.

CMS architectures are generally business critical systems. As such, it is important for operators of CMS architectures to monitor and analyze the status of the CMS to detect system failures and/or head-off system failures before the system failures cause an impact on the business.

To monitor the state of a CMS architecture, logs can be created that are associated with the CMS architecture. Logs can be generated in response to a PRINT command at the end, or during, the execution of a process. The logs may then be analyzed to determine the occurrence of a failure or predict a future failure of the CMS architecture. Waiting for logs to be generated in this manner requires that the process that includes the PRINT command complete before the log, or log-line, is generated.

The present description describes generating information associated with events occurring within a CMS architecture without the need to wait for formal logs to be generated at the CMS architecture. The event information can be translated into log files for further analysis. The event information can include information associated with content items stored using the CMS architecture, business processes associated with the CMS architecture, user interactions with the CMS architecture, and/or other events. The present description describes generating this event information without needing to wait for the completion of the event.

Consistent with implementations of the current subject matter, one or more log files generated by the events taking place within the CMS architecture can be translated into an aggregated data structure (e.g. an analytics cube), which can further support a star schema structure that can be generated dynamically in response to detected events or groups of events and/or in response to requests for reporting or other analytical measures on activities of the electronic content management system. The aggregated data structure and/or the star schema structure can facilitate the generation of a unified view of the events occurring in the CMS architecture. The unified view can provide an indication of failures (e.g. fault events or the like) within the CMS architecture and/or facilitate the prediction of future failures within the CMS architecture. The unified view can present data from the analytics cube, which can include aggregated An analytics cube can include a multi-dimensional array of data. The data of the analytics cube can be analyzed to look for insights into the data. The unified view can facilitate the probabilistic prediction of future events.

The term "analytics cube" generally refers to a multi-dimensional data structure useful in supporting online analytical processing (typically referred to by the acronym "OLAP"). The alternative term "OLAP cube" is generally synonymous with an analytics cube. OLAP approaches are generally directed toward automated or otherwise computer-implemented techniques for analyzing large, multi-dimensional data sets to identify relationships or other insights (e.g. trends or the like) and to efficiently reply to multi-dimensional queries.

In an analytics cube, numeric facts (which can be referred to as "measures") can be categorized by dimensions. The measures are placed at the intersections of the cube, which is spanned by the dimensions as a vector space. While the term "cube" is commonly used, it does not denote or require exactly three dimensions (e.g. the number of dimensions can be any number) or any kind of symmetry between the dimensions (e.g. "sides" of the "cube"). Dimensions in a data cube (or any data structure) generally refer to structured labeling of information used to organize otherwise unordered numeric measures.

The presently described analytics cube can be configured to facilitate the generation of reports that distinguish between individual pieces of content or content repository artifacts, maintained by the CMS architecture, for example, sites, folders, groups, or the like. The analytics cube can facilitate the generation of reports that facilitate click-through access to content and/or content artifacts by a viewer of the reports. The generated reports can include information such as one or more actions associated with the content, metadata associated with the content, binary form of the content, or the like.

In some variations, the generated reports associated with a content item can be configured to be accessed by only authenticated users of that content item. In other variations, users having the necessary permissions to access the report, but not the content item, can be granted access to view the report, but can be denied click-through access the content if they do not have the necessary permissions to access the content item.

The analytics cube can be configured to facilitate the generation of an interactive analysis interface for display on a user device associated with a user. The interactive analysis interface can be configured to facilitate user interaction with a report, content associated with the report, or the like. The interactive analysis interface can be configured to facilitate on-demand analysis of content across multiple dimensions of the CMS, supported by the analytics cube.

The analytics cube can be configured to facilitate storage of the generated reports. In some variations, the generated reports can be stored into the content repository. In other variations, the generated reports can be stored in a separate report content repository. The reports can facilitate providing insight into the use of the content repository including user-usage-patterns of content stored in the content repository.

In some variations, the analytics cube can be part of an analytics engine. The analytics engine can be logically and/or physically separate from the CMS architecture. When two or more computing systems are "logically separate" the computing systems can operate on a single machine that has been partitioned into two or more logical partitions. Typically, each logically separate computing system runs its own operating system. Physically separate computing systems include multiple computing systems operating on individual machines.

Having the analytics engine separate from the CMS architecture can facilitate generation of a unified view of the CMS architecture without impacting the functionality or performance of the CMS architecture. Reports can be generated by the analytics engine associated with the events occurring in the CMS architecture. Where the analytics engine is separate from the CMS architecture, the user may be required to separately access the analytics engine and the CMS architecture to view the reports and also view the content items referenced by the reports.

The present disclosure describes computer programs, methods, and/or systems for facilitating access to content items maintained by the CMS architecture by users viewing reports, referring to those content items, stored in a report repository and/or generated by an analytics engine separate from the CMS architecture. The present disclosure describes facilitating access to content items on a CMS architecture, from a report generated by a separate analytics engine, without the need for the user to separately log into the CMS architecture.

FIG. 1 shows a diagram illustrating features of a computing architecture 100 consistent with implementations of the current subject matter. A CMS 102 can generally include at least one programmable processor executing some form of machine-readable instructions (e.g. software code, etc.) to provide one or more content management functions. In some variations, the CMS 102 can be cloud-based. The cloud-based CMS can include a cloud-based repository. The cloud-based CMS can be isolated to provide access only to authorized users of a specific location within the cloud-based installation. Alternatively or in addition, computer hardware can be configured to perform one or more of the operations or the like described herein.

A typical enterprise may own or otherwise manage or have custodial responsibility for content 106 subject to a range of access controls. Some content 106 of the enterprise may be freely sharable, while some other content 106 may be highly confidential or otherwise subject to security control. However, a third type of content 106 of the enterprise may exist somewhere between these two extremes.

Currently available approaches to enterprise content management generally do not include capabilities relating to the capture, analysis and reporting of events that occur within the CMS 102. It is typical for content 106 that is managed by a CMS 102 of an enterprise to be stored on electronic storage 108. In response to a user accessing the content 106, the CMS 102 can be configured to lock the content 106 from further edits by other users. If another user attempts to access the content 106 and make modifications, the other user can be prohibited from accessing the content 106. In some variations, the other user can be prompted that the content is locked to editing, and/or any content modified by the other user can be saved as another version of the original content 106. In some variations, where content 106 is locked, or "checked out," other users are prohibited from both saving over the content 106 stored in electronic storage 108 and from saving the modified content as another version of the content 106. The original user can save any modified content over the original content 106 or cause the modified content to be saved as a new version of the original content 106.

Services and controls for managing content of a CMS 102 consistent with implementations of the current subject matter can include features such as metadata management, version control, lifecycle management, workflow, search, associations to other content, tagging, commenting, etc. that allow users of the CMS 102 to find desired content items among very large content collections that can span multiple parts of an enterprise. Accuracy and consistency of the information can also be ensured, even for very large content collections across an enterprise. Content and other information in a CMS 102 can be presented, published, etc. through the Web or any other channel appropriate to allow users to access that information.

In addition to supporting features typical of a cloud-based or "software as a service" (SaaS) software delivery model, a synchronization scheme consistent with the descriptions provided herein can provide a number of desirable features. For example, the current subject matter can support automatic synchronization of content between one or more CMS-managed repositories that are inside of a firewall and a copy of one or more content items that are made accessible to authorized collaborating users of the collaboration site in the cloud. Such features can enhance ease of engagement and collaboration both between users within an organization and other collaborating users who are external to the organization. The term firewall is generally used throughout this disclosure to refer to network security controls, features, functionality, etc. that restrict access to users outside of the firewall to content retained on one or more repositories inside of that firewall.

Users 110 can access the CMS 102. Users 110 can access content 106 managed and maintained by the CMS 102 after being authenticated. In some examples, authentication can be established through interaction of the user 110 with one or more user interface elements, such as for example a window, navigation pane, or other display feature including one or more user interface elements, an inline prompt, etc. The interface element(s) can be managed by the CMS 102. The user(s) can be internal users or external users 110. Internal users 110 can be users that are within a firewall 112. Internal users 110 can be users that operate from within a firewall managed by the CMS 102. External users can be users that operate from outside a firewall managed by the CMS 102. External users may be required to seek authorization to access programs and systems that are within the firewall 112. A firewall 112 can exist within the CMS 102 between various components and areas of the CMS 102. In some examples, an additional or alternative a firewall 114 can exist between the CMS 102 and one or more servers configured to provide additional functionality to the CMS 102.

The user(s) 110 can be required to supply authentication credentials on at least a first request to set up a synchronization between a content item held within the firewall-protected installation of the content management system 102 and a copy of the content item stored on a computing device of the user(s) 110. The authentication credentials can be saved in a secure credentials store, or the like, for future synchronization actions. Optionally, the authentication credentials can be checked for accuracy when they are entered to prevent, for example, an incorrect password, username, or other credentials, from being saved in the secure credentials store.

The CMS 102 can include a permissions log. When a user 110 attempts to access the CMS 102 through the firewall 112, a determination of whether the user 110 can access the CMS 102 can be determined. Once within the firewall 112, or if the user 110 originated from within the firewall 112, a determination can be made as to whether the user 110 has permission to perform each of the tasks or activities requested by the user 110. The permissions log can include a list of users of the CMS 102 and their respective permissions. The permissions log can include information as to the access rights of users to content items 106, business process applications (BPAs) 116, and the like. While a permissions log is described, the present description contemplates multiple permissions logs. In some variations, each content item 106 or BPA 116, for example, can include its own permissions log. The term "content" is generally used throughout this disclosure to mean folders, files, directory structures, or the like (also referred to herein as "content items"). In addition to permissions logs, other log files may be generated by a CMS 102, such as for example to record changes to content and/or metadata associated with content items, file structures, and the like. Transaction logs can reflect data and/or metadata updates and/or whether such updates have been committed (e.g. in a case in which changes to data and/or metadata are initiated from a remote system and may not be committed to the actual content item stored in the CMS repository until some further action is taken by a user, task, workflow, application, etc.

Consistent with some aspects of the current subject matter, one or more dynamically configurable BPAs 116 can be supported within an installation of a CMS 102. A BPA server 118 can manage and maintain the BPA(s) 116.

As referred to herein, a BPA 116 can be based on an application model definition (AMD), which can define functionality for guiding one or more users through a set of actions consistent with completion of an instance of a business process (or other structured arrangement of activities, tasks, etc.). The set of actions can include either, or both, of tasks requiring interactions of one or more human users of CMS 102 and automated actions (e.g. actions performed by a system without direct human interaction). A BPA 116 can be used multiple times for discrete "workflow instances" (also referred to as "execution instances") of a business process or part of a business process supported by the BPA 116.

Dynamically configurable, customizable BPAs 116 such as those described herein can guide workflow instances based on a current context of one or more users, documents (or other content items), systems, etc. This guidance can be provided via a user-interface defined by the BPA being executed as part of a workflow instance, which can in turn be part of a case. As discussed in greater detail below, a BPA 116 can optionally be initially configured using an application development user interface (ADUI), and can itself include user interface features that promote collaboration and information access among multiple users involved in a content management-based business process. Some variations of the current subject matter include hybrid BPAs 116, which can be configured to execute from one CMS installation while being able to access content on a second CMS installation, even if the second CMS installation is behind a firewall. In this way, a BPA 116 can be a Web application, which can access both content maintained at a first, cloud-based CMS repository and content maintained at a second, on-premise CMS repository. Synchronization of workflow actions, content, and case data relating to execution of one or more workflow instances can readily occur between the CMS repositories of the two CMS installations.

An AMD can be constructed using an ADUI, such as for example an ADUI having one or more of the features further discussed below. An AMD can serve as a modeled framework for one or more BPA variations. For example, an AMD can be directed to a business process for content creation, modification, approval, and execution, such as a business process relating to generation, revision, review, signing, archiving, etc., of a contract. Other examples of AMDs can include collaboration applications, records management applications, and the like.

A BPA 116 based on an AMD can be defined with greater specificity to tailor the BPA to reflect details of one or more business processes specific to a sub-organization of the enterprise (e.g. a legal department, a human resources department, etc.) or to some other organization, for a different specific purpose, etc. As used herein, a BPA 116 refers to a variation, version, instance, etc. of an application model (defined by an AMD), which can be further refined or defined based on one or more expected use criteria, such as for example a target audience that will use the BPA 116, a specific set of custom actions related to tailoring the BPA 116 to a target use, or the like.

As an example, the contracts application model discussed above can be deployed as a legal contracts BPA, a human resources contracts BPA, a real estate contract BPA, or the like. As discussed further below, a BPA 116 can also be dynamically configurable such that user actions in response to guidance provided by the BPA 116 during a workflow instance based on the BPA 116 can deviate from the guided or recommended actions as defined in the BPA 116. Such user actions can also impact guidance provided by the BPA 116 in the course of subsequent workflow instances based on the BPA 116. In some examples, a user can save a modified or new BPA based on updated or altered guidance developed at least in part based on case data retained for one or more past workflow instances.

As used herein, a workflow instance refers to a specific instance or iteration of a set of actions guided by a BPA 116 for a specific document or set of documents. As an example, for a BPA 116 related to contract review, the review of a contract or a set of related contracts can constitute a workflow instance of the BPA 116.

Information associated with events occurring in the CMS 102 can be extracted using one or more processes. For example, an extract, transform, and load process can be used to extract information associated with events occurring in the CMS 102. The information associated with the events can include events associated with content items 106, business processes applications 116, and/or other elements of the CMS 102. After the information is extracted, the resulting data can be transformed, for example by applying one or more rules or functions to prepare these data for loading into an integration database. It will be understood that some extracted data may not require transformation.

The information associated with events occurring within the CMS 102 can include events associated with content items 106 stored and/or maintained by the CMS 102. The CMS 102 can comprise electronic storage 108 configured to store and maintain the content items 106. Users 110 can interact with the content items 106 through interaction with the CMS 102, through one or more intermediary applications, workflows, or the like. Different types of interaction with the content items 106 can be an event. For example, opening, modifying, saving, creating a new version, closing, deleting, moving, updating of the content item 106, or the like, can generate event information. As noted above, event information can be maintained by the CMS in the form of one of more log files.

The information associated with the CMS 102 can include events associated with a BPA server 118. In some variations, users 110 may not interact with the BPA server 118 or the BPA(s) 116 directly, but may interact with the BPA(s) 116 and/or BPA server(s) 118 through intermediary or third-party applications.

A BPA 116 can cause one or more business processes 120 to be executed. A business process 120 can include one or more actions or transactions. Event information can be generated for each of the BPAs 116, the business processes 120, and/or for the individual actions or transactions that comprise the business processes 120.

Use of, or interaction with, BPAs 116 by users 110 can generate multiple different types of event information. BPAs 116 may interact with content items 106 maintained by the CMS 102. Consequently, event information associated with the BPAs 116 and the content items 106 can be generated based on a single user interaction.

Event information can be generated based on the performance and/or functionality of the CMS 102 components. For example, the CMS 102 can comprise multiple software, firmware, and hardware components. Performance of, for example, a server of the CMS 102, a BPA server 118, a computing device associated with a user, or the like, can generate event information.

FIG. 1 includes a conceptual representation of event information 122 in the CMS 102. The present description contemplates the event information 122 being transferred to an analytics engine 124 in response to the creation of the individual event information 122. In some variations, event information 122 may be generated from one or more sources at roughly the same time. This event information can be aggregated at the CMS 102 and transmitted to the analytics engine 124 together. In some variations, the event information 122 from separate sources and/or events is separately transmitted to the analytics engine 124.

The analytics engine 124 can be logically and/or physically separate from the CMS 102. Logical separation can refer to a state where the software processes associated with a first task occur without interference from the software processes associated with a second task. For example, the processors configured to perform tasks associated with the analytics engine 124 can be the same processors configured to perform tasks associated with the CMS 102, however, for purposes of the processing, the two tasks are totally separate, without one task relying on a process of the other task. In other words, the processes associated with a first task are independent of the processes associated with a second task. Physical separation can refer to processors that are physically separate from each other. Physically separate processors can be located within the same computer housing, but are otherwise separate and independent from one another. In other variations, physically separate processors can be disposed in completely separate machines.

The event information 122 associated with the occurrence of an event in an CMS 102 can be accepted (e.g. received) by an analytics engine 124. The event information 122, which can optionally be in the form of one or more log filed, transaction logs, etc., can comprise one or more event topics having event topic types. Event topics can optionally include serialized event data.

In some variations, a queuing mechanism can be used to transmit the event information 122 to the analytics engine 124. The queuing mechanism can be configured to deliver the event information 122 to the analytics engine 124 without impacting the performance of the CMS 102. In some variations, the queuing mechanism can be configured to provide the event information 122 to the analytics engine 124 in real-time or near-real-time. Such a queuing mechanism can facilitate delivery of event information 122 to the analytics engine 124 without having to wait for the underlying transaction to be completed. The queueing mechanism can be configured as either (or optionally both) of a push or a pull arrangement for moving data from the CMS 102 to the analytics engine. For example, the CMS 102 can be configured to push event information to the analytics engine 124 concurrently with writing of relevant information to one or more log files at the CMS 102. The term "concurrently" as used herein can refer to actual simultaneous execution of two or more operations or to a serial arrangement in which a first operation and a second operation are not actually performed simultaneously, but nonetheless occur sufficiently closely in time to be effectively concurrently with regard to a relevant time period. Alternatively or in addition, the analytics engine 124 and/or the CMS can be configured such that the analytics engine 124 requests or "pulls" event information from the CMS 102 (e.g. by querying log files or the like) on a scheduled basis or in response to indication from the CMS that one or more trigger conditions have been met (e.g. occurrence of a certain number of events generating related event information, etc.).

The analytics engine 124 can comprise a broker 126. In some variations, the broker can include a JAVA messaging server. The event information 122 can be routed to the broker 126 as discussed above (e.g. either by a push or pull queuing mechanism). The broker 126 can be configured to maintain data routing continuity by storing the received event information 122 in a system memory. The event information 122 can be routed to the broker 126 in real-time or near-real-time.

The broker 126 can include one or more topics (also referred to as channels). The event information 122 can be binned into the one or more topics based on the event information type. In some variations, the event information 122 can be tagged with an event type. The event type can be based on the source of the event information 122. For example, event information 122 emanating from an interaction with content items 106 maintained by the CMS 102 can include a CMS event type, event information 122 emanating from BPAs 116 can include a BPA event type, and the like. In this manner, the broker can operate as a pre-aggregator to collect and aggregate event information relating to similar event types into common topics 128.

The event types can include activities, tasks, processes, or the like. Activities 130 can include user-interactions with content items 106 maintained by the CMS 102. In some variations, processes 134 can be generated from tasks 132. The broker 126 can be configured to store the event information 122 in different event type categories, in memory. This can take the form of different event type bins 128, which can include an activities bin 130, a tasks bin 132, a processes bin 134, or the like.

The analytics engine 124 can include one or more agents. For example, the analytics engine 124 may include a first event listener 136 and a second event listener 138. The event listeners 136, 138 can be subscribed to one or more of the event type bins 128. The event listeners 136, 138 can be configured to extract, from the event-type bins 128 the event information 122. For example, the first event listener 136 may be an activity listener. The activity listener can be configured to subscribe to the activity topic 130. Event information binned into the activity topic bin can be extracted by the activity listener. The second event listener 138 may be a task listener. The task listener can be configured to subscribe to the task topic 132 and/or the process topic 134. Event information binned into the task topic bin and/or the process topic bin can be extracted by the task listener.

As noted above, the broker 126 can be configured to sort the event information into one or more event type bins 128. The sorting can be optionally performed by one or more message listeners. The one or more event topic bins can be based on the event topic type. The one or more message listeners can be configured to subscribe to an event topic type.

The event information 122 stored in the event type bins 128 can include different event information elements 140. The event information elements 140 can include one or more of a time, user information, serialized data, status information, a time-stamp, or the like. The serialized data can include event-type-dependent data. For example, if the event-type was a log-in, the serialized event data may not include additional data. If the event-type was a download of a content item 106, the serialized data may include an identity of the content item 106, the site location of the document, the site location of the user downloading the content item 106, the file size of the content item 106, the format of the content item 106, etc., or the like. In some variations, the event information can be comprised of metadata.

In some variations the broker 126 can be configured to determine whether any of the stored event information 122, whether taken individually or in aggregated form as in an analytics cub, includes or relates to a failure or other "fault event" occurring at the electronic content management system. Such event information is referred to herein as "fault event information.". The broker 126 can store the fault event information locally. The broker 126 can be configured to analyze and diagnose a fault, or other failure, introduced by or related to the fault event information. In some variations, the broker 126 may store the fault event information until an administrator can review the fault event information. In some variations, the broker 126 may be configured to transmit an indication of the fault event information and/or information associated with the fault event information to an administrator computing device for review by an administrator.

Event information 122 which may include fault event information can be stored in an electronic storage 142 that is logically integrated into the analytics engine 124 (and can optionally be physically part of a system implementing the analytics engine 124. The analytics engine 124, for example, can include electronic storage 142. In some variations, electronic storage 142 can be associated with the broker 126. Electronic storage 142 can be collocated with one or more processors configured to provide the functionality of broker 126. In some variations, electronic storage 142 can be logically and/or physically separate from the one or more processors configured to provide the functionality of broker 126, for example as in a cloud storage system.

In some variations, the event listener agents 136 and 138 can be configured to write the binned event information to a staging area database. The event information can be stored in the staging area database based on the one or more event topic types. The staging area database can be maintained on electronic storage, for example, electronic storage 142. In some variations, the event information stored in the staging area database can be stored in serialized form. The staging area database can comprise one or more staging database tables 144, which can in one example include a staging area database table for activities 130, a staging area database table for tasks 132, and a staging area database table for processes 134. A staging area database table can optionally be created and/or an existing staging area database table used for each of the one or more event topics, which can be associated with one or more attributes of the event information. In this example, the staging area database table (or, optionally, more than one staging area database table) for a given event topic can be what is referred to elsewhere herein as an event topic bin for collecting information relating to the associated one or more attributes. The staging area database tables 144 can be created real-time, or near-real-time, as events occur in the EMS 102.

Figure 2:
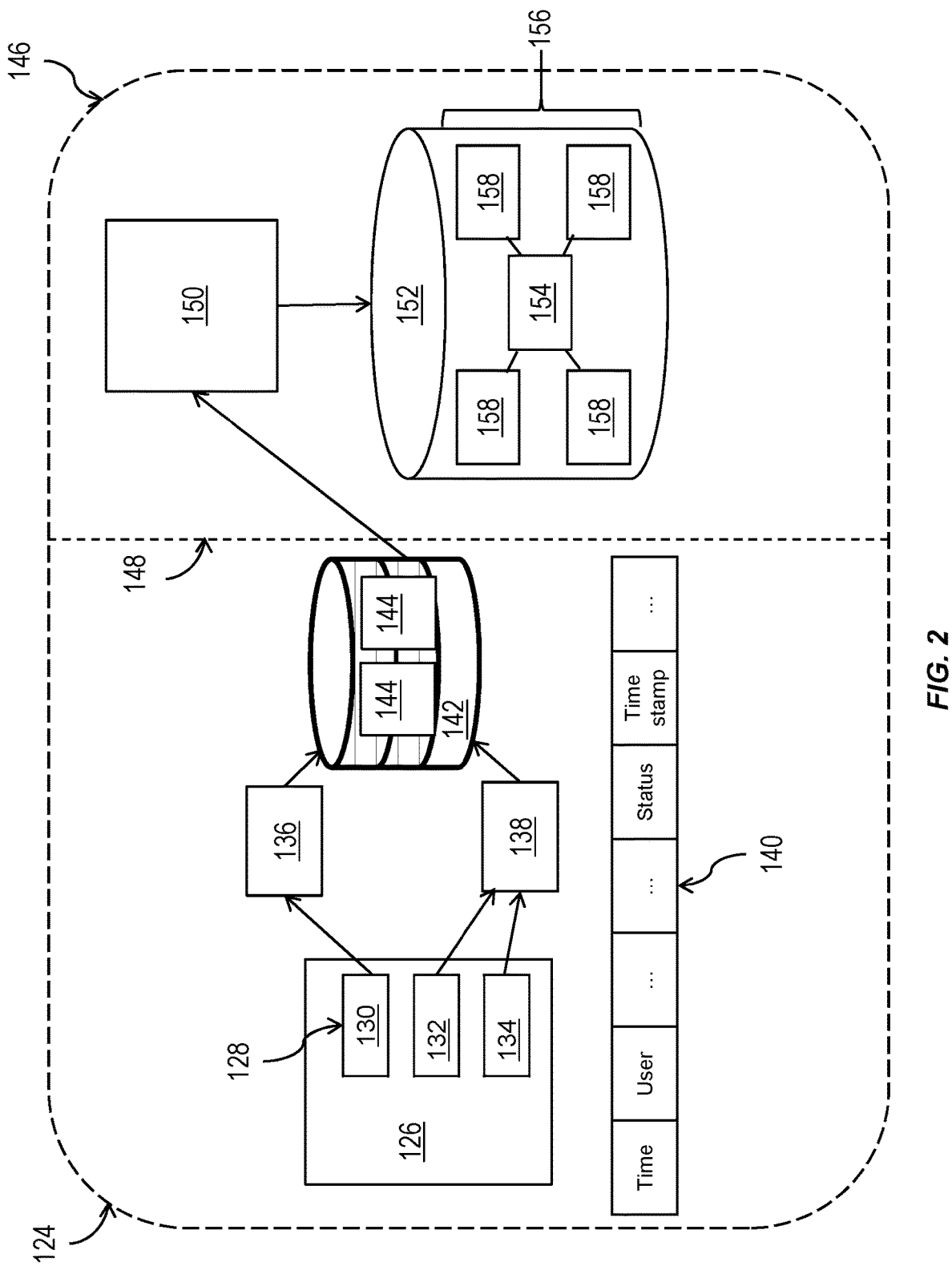
FIG. 2 is an illustration of an analytics engine having one or more elements consistent with the present description.

FIG. 2 is an illustration of an analytics engine 124 having features consistent with the present description. The event information binned by event topic and stored in the staging area database on electronic storage 142 may be transferred to a data analyzer 146. The data analyzer 146 may be logically and/or physically combined within the rest of the analytics engine 124. In some variations a system boundary 148 may be provided.

The data analyzer 146 may comprise a data integrator 150. The data integrator 150 can be configured to integrate the binned event information. The data integrator 150 may operate on an integration schedule. The integration schedule can be predefined by an administrator. For example, the data integrator 150 may operate every 2 minutes, every 5 minutes, every 10 minutes, or the like. The data integrator 150 can operate on any schedule.

The data integrator 150 may be logically linked with an integration database 152, which can include an analytics cube 153 and optionally one or more relational database features. The integration database 152 may include one or more fact tables 154. The fact tables 154 may be arranged as a star schema 156, which is generally a type of relational database structure. The fact tables 154 can reference any number of dimension tables 158. The fact tables 152 may include foreign keys referencing the dimension tables 156. Data can be received at the integration database 152 and input into the one or more fact tables 154. In some variations, the data received at the integration database 152 may be in the form of a fact table 154. The new fact table 154 can be integrated into the star schema 156.

The star schema 156 can be a style of data mart schema. It can be used to develop data warehouses and dimensional data marts. The star schema can consist of one or more fact tables referencing any number of dimension tables. The star schema is so-named from the physical model's resemblance to a star shape with a fact table at its center and the dimension tables surrounding it representing the star's points.

In some variations, the integration database 152 can include one or more separate star schemas 156 for each event information type. For example, the integration database 152 can include a star schema 156 for activity-type event information, a star schema for task-type event information, a star schema for process-type event information, and the like. In other words, the separate star schemas can be created to enable further analysis of the data stored in the staging area database tables (e.g. the event topic bins). A star schema can optionally be created for each event topic and/or each of the one or more attributes associated with the event topic bins. The data in the star schema can be populated from the analytics cube 153, which can in turn be populated via integrating, aggregating, consolidating, or the like of data stored in the staging database tables 144.

The data integrator 150 may be configured to extract, transform and load the binned event information stored in the staging area database (e.g. in the staging area database tables 144). The data integrator 150 can be configured to process the unstructured serialized data 140 of the event information stored in the staging area database tables 144 into the structured star schema 156 stored on the integration database 152. The star schema can include primary key-based relationship between data-types.

In some variations, the data integrator 150 may be configured to obtain the binned event information from the staging area database. The data integrator 150 may be configured to process the status information in each row 140 of the staging area database tables 144. The data integrator 150 can be configured to update the row 140 with a timestamp providing the time at which the row was processed. The data integrator 150 can be configured, based on the timestamp information in each row of the staging area database tables 144, to determine whether or not that row has been processed by the data integrator 150. In some variations, the data integrator 150 can be configured to overwrite the timestamp information in each row of the staging area database table 144 that it processes. The data integrator 150 can be configured to extract, transform and load data based on a desired set of information required to provide the reports desired by the operator of the CMS 102. In some variations, the integration database 152 can be referred to as a data warehouse.

Integration (also referred to as consolidation) can be an important aspect of OLAP approaches involving aggregation of data that can be accumulated and computed in one or more dimensions. The integration database 152 of the current subject matter (e.g. an analytics cube 153) stores pre-computed data in a format that contains all of the possible answers to ranges of possible queries and can therefore provide very rapid response times to such queries. Consistent with implementations of the current subject matter, a data integrator 150 can perform the data integrations, consolidations, etc. necessary to populate the integration database 152 as discussed above.

Figure 3:
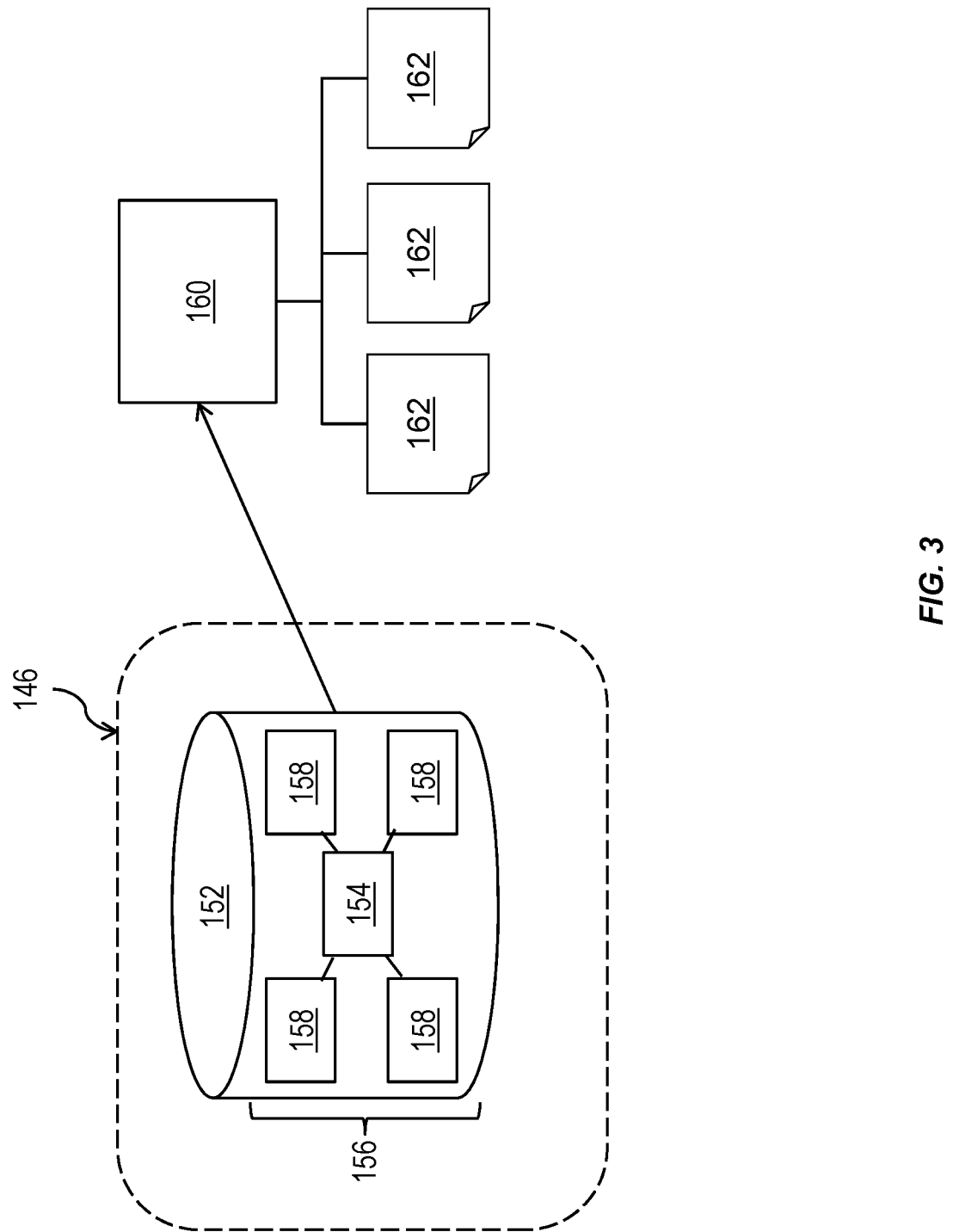
FIG. 3 is an illustration of an analytics engine having one or more elements consistent with the present description.

FIG. 3 is an illustration of an analytical engine having features consistent with the present description. The integration database 152, or data warehouse, can be in electronic communication with one or more analysis computing devices 160. The one or more analysis computing devices 160 can be configured to implement a report engine for performing one or more tasks of the analysis computing devices 160. The analysis computing device 160 can be configured to be operated by one or more analysts. In some variations, the analysis computing device(s) 160 can be, or include, a server. The server can be configured to be in electronic communication with the integration database 152. The server can be a business analytics server. The analysis computing device(s) 160 can be configured to provide business analytics reports 162 associated with the events occurring within the CMS 102.

Various implementations of the current subject matter can, among other possible benefits and advantages, provide real-time, or real-near-time, business analytics information associated with events occurring on the CMS 102. Providing real-time or near-real-time business analytics information can, among other possible benefits and advantages, facilitate determination of faults within the CMS 102 as they arise, or near to when they arise, and/or facilitate determination of future possible faults within the CMS 102.

Alternatively, or additionally, event information associated with both content items 106 and task and/or process information can be provided simultaneously, thereby facilitating business analytics on both content items 106 and task and/or process information in real-time, or near-real-time.

Although the examples described herein refer to a CMS installation, an enterprise can maintain multiple CMS installations or collaborate with other enterprise CMS installations. The current subject matter can be configured to synchronize one or more of folders, files, directory structures, or the like, and business processes from a first installation of a CMS to a second CMS installation. Access restrictions on content items can be mirrored on the other CMS installations. Collaborations on content items can be facilitated between multiple on-premise users as well as users external to the premises at which the CMS installation is maintained. The variations of the subject matter described in this disclosure refer to two users modifying content simultaneously. This is for ease of explanation. The current subject matter contemplates multiple users concurrently modifying the content. The current subject matter can facilitate modification of the content by one, two, three, four, five or more users, or groups of users, concurrently.

Services and controls for managing content of a CMS consistent with implementations of the current subject matter can include features such as metadata management, version control, lifecycle management, workflow, search, associations to other content, tagging, commenting, etc. that allow users of the CMS to find desired content items among very large content collections that can span multiple parts of an enterprise. Accuracy and consistency of the information can also be ensured, even for very large content collections across an enterprise. Content and other information in a CMS can be presented, published, etc. through the Web or any other channel appropriate to allow users to access that information.

Figure 4:
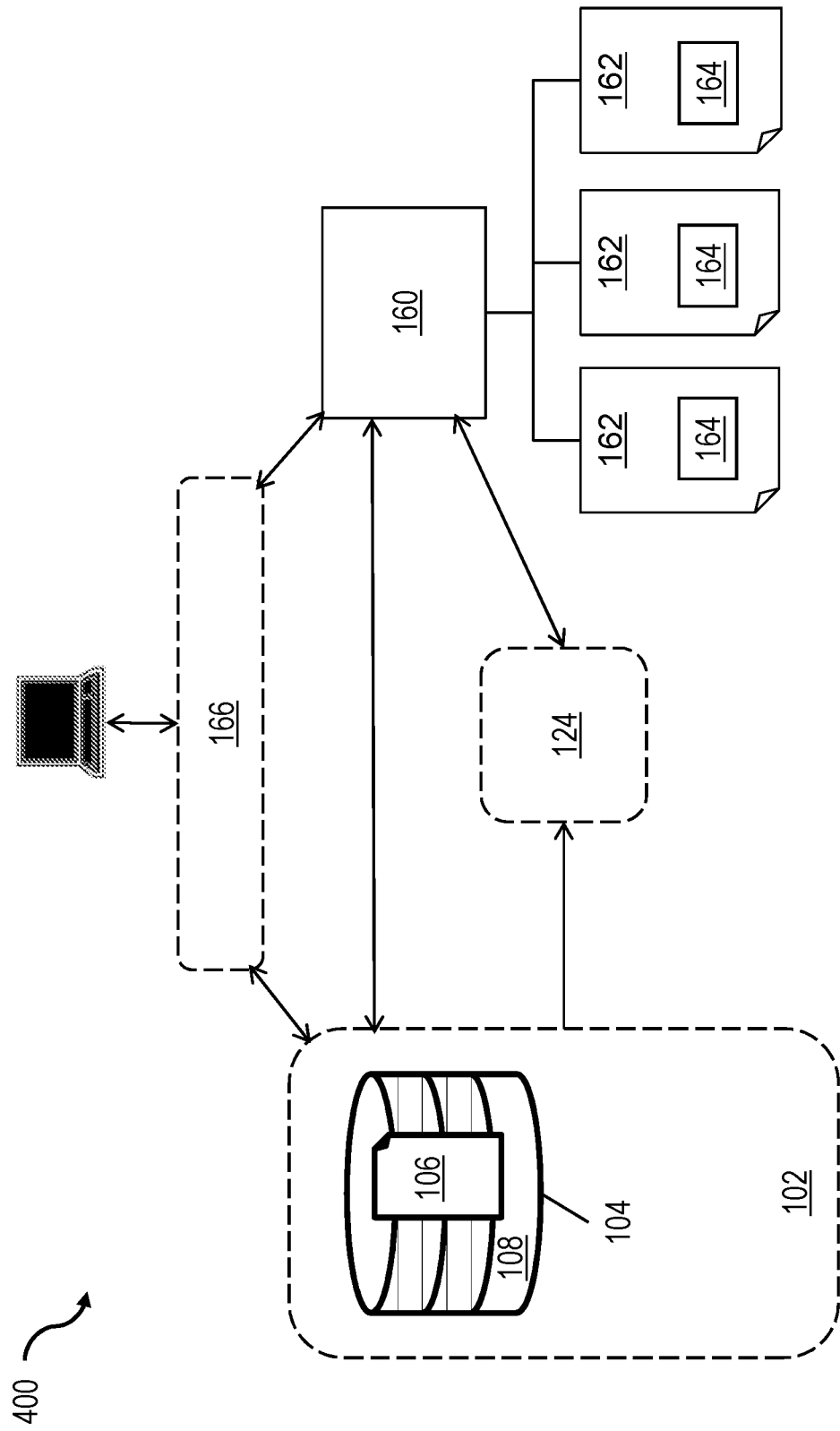
FIG. 4 is a schematic illustration of a system having one or more elements consistent with the present description.

FIG. 4 is a schematic illustration of a system 400, having one or more features consistent with the current subject matter. In one use case, a user 110 can request access to content 106 stored on the data storage system 108 managed by the CMS architecture 102. The CMS 102 can require log-in credentials from the user 110. The CMS 102 can lock the content item 106 from being edited further by other users. The user 110 can be presented with the content item 106 through a display of a user device associated with the user 110.

In some variations, the user 110, may request a report using an analysis computing device 160. The analysis computing device 160 can be configured to provide analytics reports 162 associated with events occurring within the CMS 102. In some variations, the user may access the analysis computing device 160 and/or analytics reports 162 directly. In other variations, the user 110 may access the analysis computing device 160 through a centralized log-in system 166. The centralized log-in system 166 can facilitate access to various elements of the system 400 in a seamless manner as perceived by the user.

In some variations, in response to receiving the request from a user to access the report, a query can be executed. The query can include one or more attributes of the request to access the report. The query can include a set of user permissions associated with the user. The set of user permissions can limit access for the query to the content managed by the CMS 102. The limitation to the content by the CMS 102 can be limited to content accessible to the user based on the set of user permissions.

The centralized log-in system 166 can be hosted on a log-in server separate from the CMS 102 and/or the analysis computing device 160. The centralized log-in system 166 can be hosted on the CMS 102, the analysis computing device 160, or both, and provide access to all elements of the system 400. The analysis computing device 160 can be configured to communicate directly with the CMS 102. The analysis computing device 160 can be configured to communicate with an event data warehouse, such as integration database 152. In some variations the analysis computing device 160 can access information stored on the integration database 152 through an analytics engine 124. In some variations, where the data analyzer 146 is separate from other components of the analytics engine 124, the analysis computing device 160 can communicate with the data analyzer 146 to access the information stored on the integration database 152. The integration database 152 can include one or more fact tables 154 configured to maintain data on events occurring in, or associated with, the CMS 102.

Events can include interactions, performance, and the like, of the CMS 102, components of the CMS 102, or the like. Events can include user interactions with the CMS 102, content managed by the CMS 102, modifications to user profiles, group profiles, or the like, or other CMS-related events.

The analytics reports 162 can include event links 164. The event links 164 can facilitate click-through access, for a user viewing an analytics report 162, to access information associated with the event(s) that is the subject of the analytics report 162. In response to an interaction, by the user, with an event link 164, the subject of the event link 164 can be presented to the user. As an example, the subject of the event link 164 can be content 106 managed and maintained by the CMS architecture 102. The subject of the event link 164 can include the binary of the content 106, metadata associated with the content 106, or the like.

The analysis computing device 160 can be configured to generate an event report 162 comprising an event link 164. The event link 164 can include a link to the event that is the subject of the event report 162. The event link 164 can include a cryptographic key. The cryptographic key can be generated by the CMS 102. The cryptographic key can be shared with the analytics engine 124, the data analyzer 146, the analysis computing device 160, or the like. The cryptographic key can include an authorization to access the subject of the event. For example, where the event is content 106 stored on the data storage system 108 of the CMS 102, the cryptographic key can include an authorization, for the user, to access the content 106 on the data storage system 108. In some variations, the cryptographic key contained in the event link 164 can be a decryption key. In response to a user interacting with the event link 164, the content item 106 can be transmitted to the user device 110 of the user. The content item 106 can be encrypted. The user device 110 associated with the user, or the analysis computing device 160, can be configured to decrypt the content item 106 using the cryptographic key contained in the event link 164.

In some variations, the CMS 102 can be configured to encrypt the content item 106 prior to transmitting the content item 106 to the user device associated with a user 110. In some variations, the CMS 102 can be configured to store the content item 106 in an encrypted state.

In some variations the cryptographic key contained in the event link 164 of the event report 162 can be a one-time-use cryptographic key. After the cryptographic key has been used to decrypt or access the content item 106, the cryptographic key cannot be used again to decrypt or access the content item 106. Should the event report 164 be shared with other users of the system 400, or other entities, other users or entities may not be able to view the content item 106 through the link. In some variations, the cryptographic key may be linked to a user identity. When a user clicks on an event link 164, the cryptographic key may be modified by the user identity. User identities, for users that do not have the required permission(s) to access the link-destination, may modify the cryptographic key in a manner that prevents the cryptographic key from unlocking access to the link-destination. User identities, for users that do have the required permission(s) to access the link-destination, may modify the cryptographic key in a manner that enables the cryptographic key to unlock the link-destination and grant access to the user.

Figure 5:
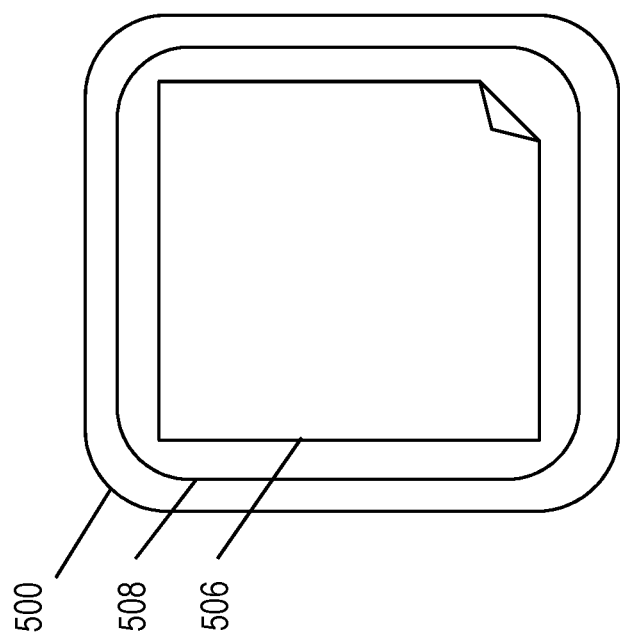
FIG. 5 is an illustration of an example of an event report having one or more elements consistent with the present description.
Figure 5:
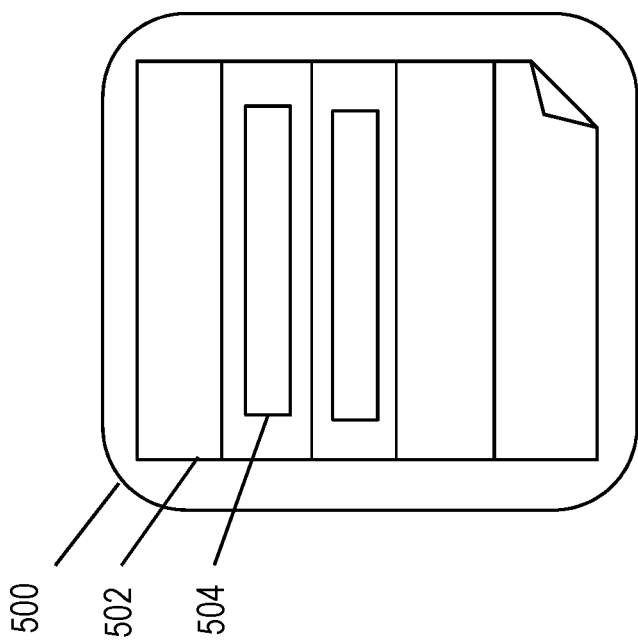

FIG. 5 is an illustration of an example of an event report 502 having one or more features consistent with the present description. In some variations, a user can request access to an analysis computing device, such as analysis computing device 160 illustrated in FIG. 4. When a user logs-in to a system, such as system 400, illustrated in FIG. 4, the user can enter their credentials to gain access to the system. While the user gains access to the analytics part of the system, including the analysis computing device, analytics engine, or the like, the user can also gain access to the EMS. The analytics engine, analysis computing device, the EMS, and the like, can be separate components, all with their separate access requirements and credential requirements. A single sign-on system, such as a single sign-on system 166 illustrated in FIG. 4 can facilitate access to the multiple separate elements of a system, such as system 400.

The user 110 can access the system and can be presented with a user environment 500. The user environment can include a secure portal into the system, such as system 400 of FIG. 4, or system 100 of FIG. 1. The user environment 500 can be configured to be presented to a user 110 on a display device of a client device associated with the user 110.

The user environment 500 can be configured to facilitate access to various systems in accordance with the user's privileges. The user's privileges may dictate that the user has access to reports, such as event reports 164, such that in response to a request to access a report associated with an event or a series of events the user is presented with an event report 502 within the user environment 500. The event report 502 can be generated by an analysis computing device, such as analysis computing device 160, and can be based on event information stored on an integration database, such as integration database 152, within a data analyzer, such as data analyzer 146.

The event report 502 can include one or more links 504. The one or more links can include links to content associated with events. The event content can include content items managed by a CMS, information associated with the performance of the CMS, or the like. In some variations, an event report 502 can be generated that includes link(s) 504 based on the requesting-user having access to the linked content in the link(s) 504. Where a requesting-user does not have the requisite permissions to access the subject of a report, the event report 502 may be generated without the link(s) 504. In some variations, when the requesting-user requests an event report 502 to be generated, the event report 502 can be generated, including the link(s) 504, but the requesting-user may not be permitted to access the content through the link(s) 504.

In response to a user 110 interacting with an event link(s) 504, the user's privileges can be verified. In some variations, the event report 502 can be generated in response to a request from a user 110. User privileges can be verified at the time of requesting and/or generating of the event report 502. The event link 504 can be configured to include links to event content that the user has privileges to access. Where the user does not have the necessary privileges to access event content, an event report 502 can be generated that does not include the event link 504. In some variations, if the user does not have privileges to access event content, the user may be denied from generating and/or viewing the report.

In response to a user interacting with the event link 504 of an event report 502 presented in a user environment 500, the event content 506 can be presented to the user in the event environment 500. In some variations, the user environment 500 can include an event content portal 508 configured to facilitate presentation of the event content 506 to the user.

In one exemplary variation, a user may interact with an event link 504. In response to the user interacting with the event link 504 the analysis computing device, such as analysis computing device 160 illustrated in FIG. 4, can request access to the event content 506, from a CMS, such as CMS 102 illustrated in FIG. 4. The request can include an indication of the privileges of the user to access the event content. In response to verifying that the user has the requisite privileges to access the event content, the event content can be transmitted from the CMS 102 to the analysis computing device 160. The analysis computing device 160 can facilitate presentation of the event content 506 to the user through the user environment 500.

Figure 6:
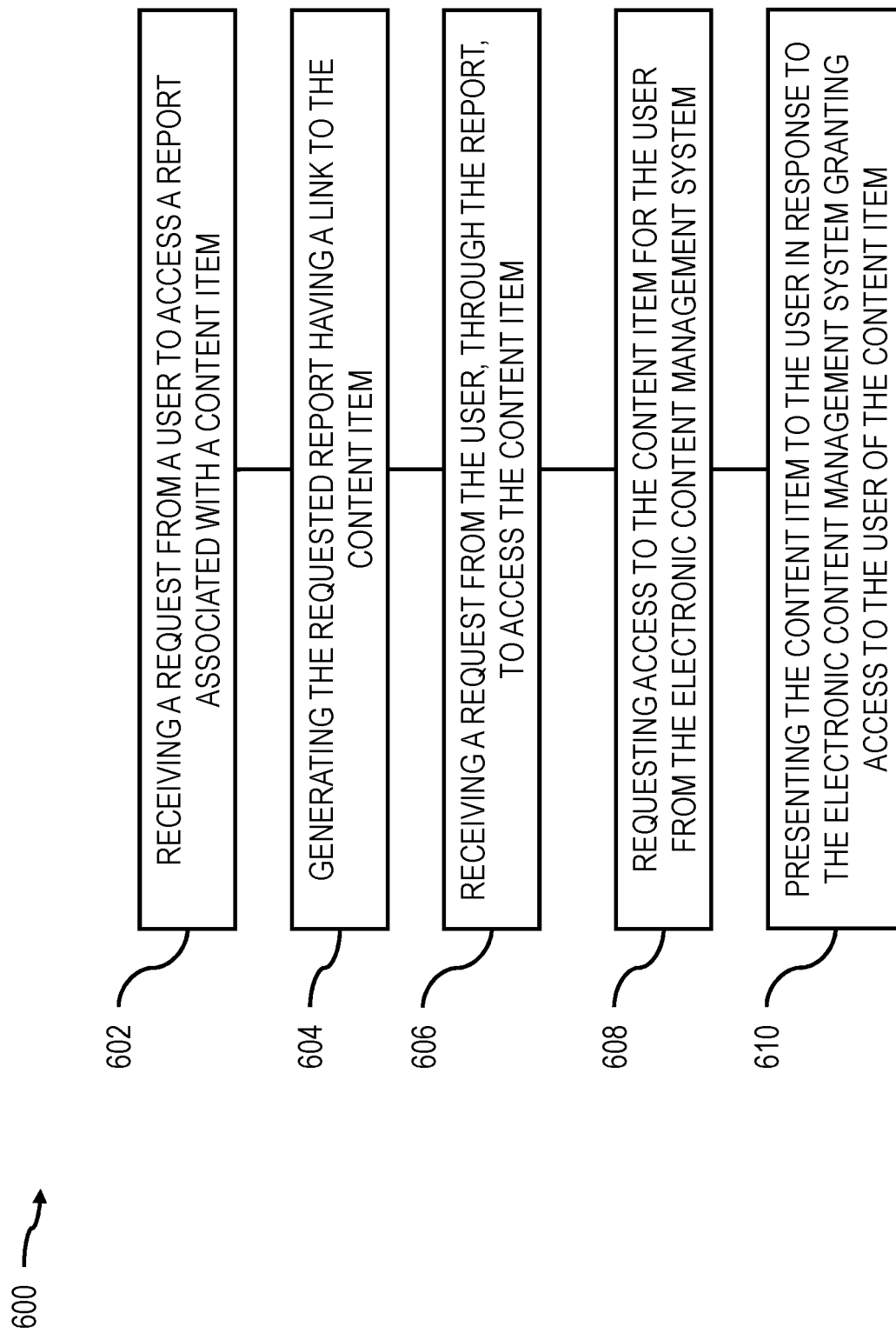
FIG. 6 shows a process flow diagram illustrating one or more features that can be included in a method consistent with implementations of the present description.

FIG. 6 shows a process flow diagram 600 illustrating features that can be included in a method consistent with implementations of the present description. The method can be executed by one or more processors and by one or more elements as described herein. While operations are described herein in a discrete manner, it is contemplated that the method may include one or more additional or fewer operations. Furthermore, operations can be combined or separated. The operations described herein can be performed by one or more processors. The operations described herein can be performed by multiple processors logically and/or physically co-located or logically and/or physically separated.

At 602, a request can be received from a user to access a report associated with a content item maintained by a CMS. The request can be received at an analytics engine. The analytics engine may be logically, and/or physically, separate from the CMS.

At 604, the requested report can be generated. The requested report can be generated by the analytics engine. The requested report can include an electronic link to the content item stored in the CMS.

At 606, a request can be received from the user to access the content item. The request can be initiated through the user's interaction with the report. For example the user can click on the link or the like. The request can be received at an analysis computing device 160.

At 608, access for the user to the content item can be requested from the CMS. The request can be generated by the analytics engine, the analysis computing device, and/or the like.

At 610, the content item can be presented to the user in response to the CMS granting access to the content item to the user. The content item can be transmitted from the CMS to one or more of the analytics engine, analysis computing device, or the like.

Figure 7:
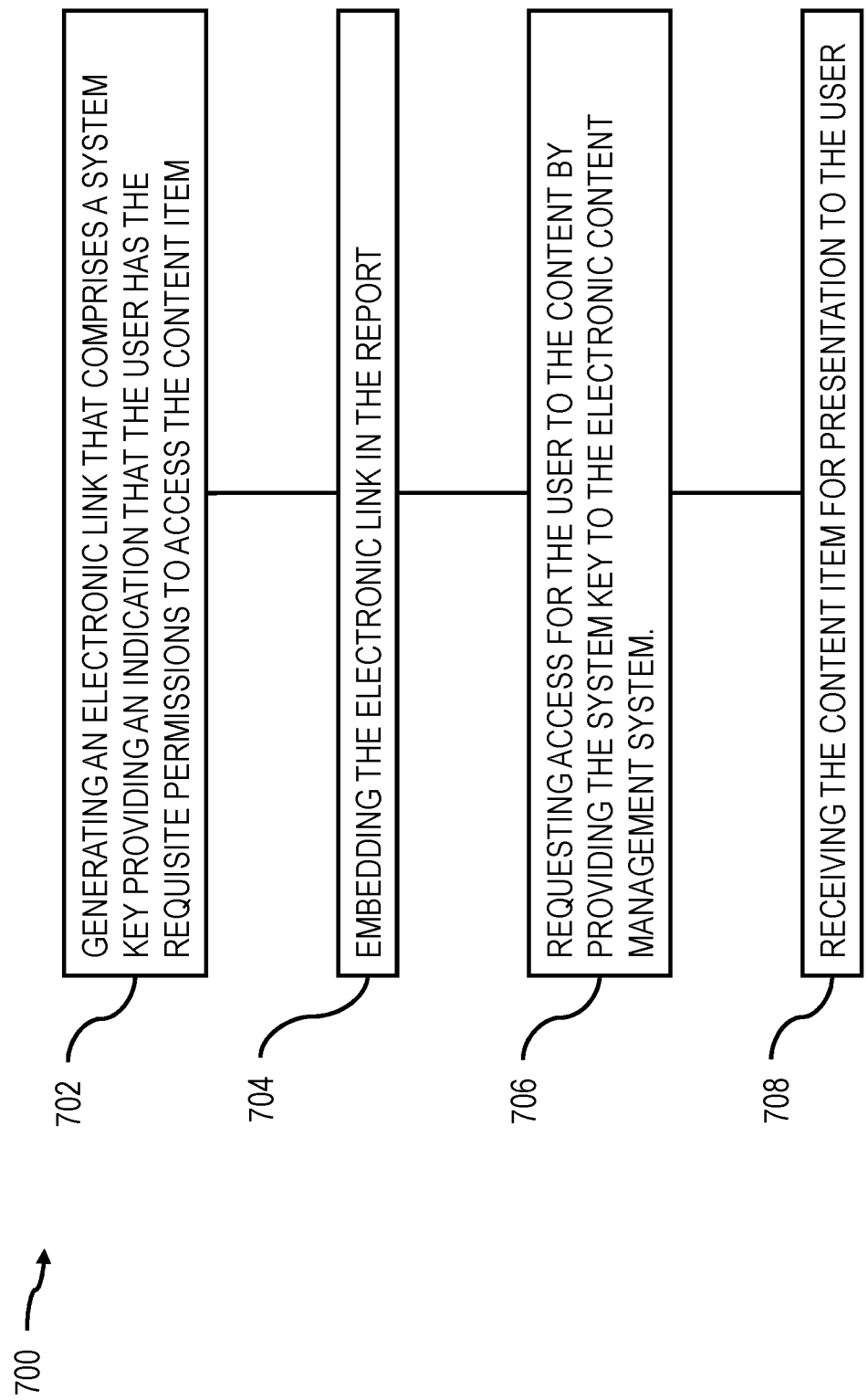
FIG. 7 shows a process flow diagram illustrating one or more features that can be included in a method consistent with implementations of the present description; and, FIG. 8 shows a process flow diagram illustrating one or more features that can be included in a method consistent with implementations of the present description.

FIG. 7 shows a process flow diagram 700 illustrating features that can be included in a method consistent with implementations of the present description. The method can be executed by one or more processors and by one or more elements as described herein. While operations are described herein in a discrete manner, it is contemplated that the method may include one or more additional or fewer operations. Furthermore, operations can be combined or separated. The operations described herein can be performed by one or more processors. The operations described herein can be performed by multiple processors logically and/or physically co-located or logically and/or physically separated.

At 702, generating a requested report at an analytics engine can include, generating an electronic link to the at least one content item. The generating of the report can be performed in response to a request, from the user, to generate the report. The electronic link can comprise a system key. The system key can provide an indication that the user has the requisite permissions to access the at least one content item.

In some variations the system key can be generated by the electronic content management system. The system key generated by the electronic content management system can be provided to the analytics engine for embedding in the electronic link. The system key can be a cryptographic key. The cryptographic key can be a one-time use cryptographic key, as described above.

At 704, the electronic link can be embedded in the report.

At 706, access for the user to the content item can be requested. Requesting access to the content can include providing the system key from the analytics engine to the CMS.

At 708, the content item can be received from the CMS and presented to the user.

In some variations, an electronic link can be generated in response to a user requesting access to the content item. The electronic link can comprise a system key, the system key can provide an indication that the user has the requisite permissions to access the content item.

Figure 8:
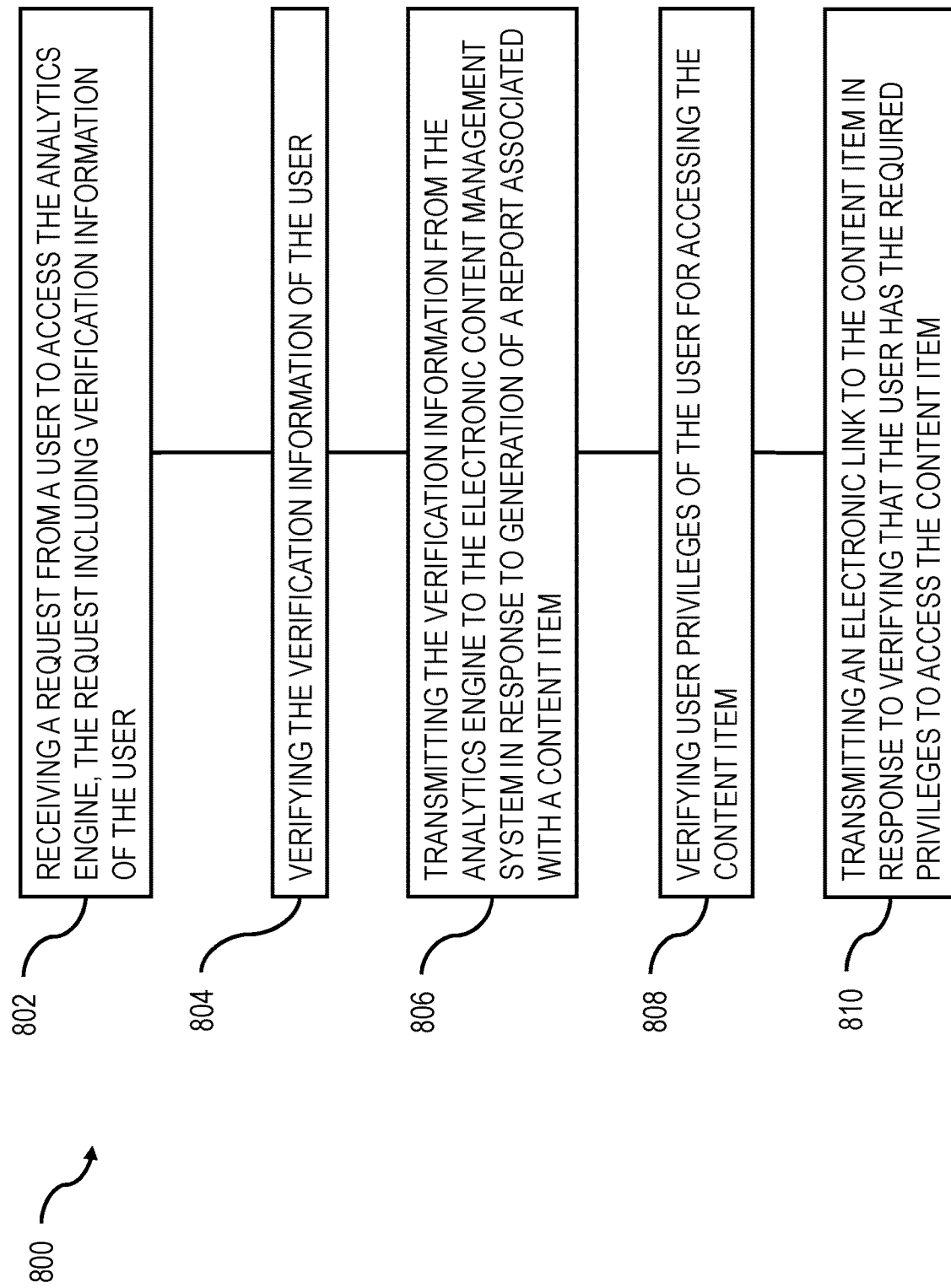

FIG. 8 shows a process flow diagram 800 illustrating features that can be included in a method consistent with implementations of the present description. The method can be executed by one or more processors and by one or more elements as described herein. While operations are described herein in a discrete manner, it is contemplated that the method may include one or more additional or fewer operations. Furthermore, operations can be combined or separated. The operations described herein can be performed by one or more processors. The operations described herein can be performed by multiple processors logically and/or physically co-located or logically and/or physically separated.

At 802, a request can be received from a user to access the analytics engine. The request can include verification information associated with the user.

At 804, the user's verification information can be verified by the analytics engine.

At 806, the user's verification information can be transmitted from the analytics engine to the electronic content management system.

At 808, user privileges can be verified at the electronic content management system. The user privileges can be associated with the content item. The user privileges can be verified based on the user's verification information.

At 810, an electronic link can be transmitted from the electronic content management system to the analytics engine. The electronic link can be to the content item. The electronic link can be transmitted in response to the CMS verifying that the user has the required privileges to access the content item.

In some variations, the generated report can distinguish between content items maintained by the electronic content management system. In some variations, the content item can be a binary representation of the content item.

Various implementations of the current subject matter can, among other possible benefits and advantages, provide single-sign-on functionality for a system that provides separate analytics and reporting of an CMS. The user can access an analytics engine to perform and retrieve analytical information about the CMS and access the content items managed and maintained by the ECM CMS in a seemingly sing-sign-on system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean "based at least in part on" such that an unrecited feature or element is also permissible.

Other implementations than those described herein may be within the scope of the following claims.

What is claimed is:

1. A computer-implemented method comprising:
   receiving a request from a user to access a report associated with one or more content items maintained by an electronic content management system, the requested report being generated, in response to determining that the user has access permission to the requested report, the requested report including a first link, a second link, and a third link to a first content item, a second content item, and a third content item;

presenting the first content item to the user, in response to determining that the first content item is freely sharable;

denying the user from accessing the second content item, in response to determining that the second content item is confidential; and in response to determining that the third content is neither freely sharable nor confidential, dynamically determining user permissions associated with the user based on matching a system key included in the third link with content of a permission log, the permission log including user content access rights data and business process application (BPA) data, wherein the BPA data defines functionality for guiding the user through a set of actions consistent with completion of an instance of a business process.

2. The method as in claim 1, wherein the system key provides an indication that the user has requisite permissions to access the third content item.

3. The method as in claim 2, wherein the system key is generated by the electronic content management system and provided to an analytics engine for embedding in the third link.

4. The method as in claim 2, wherein the system key is a one-time use key and the BPA data identifies an application that can access both content maintained at a cloud-based data repository and a local data repository.

5. The method as in claim 1, wherein
requesting access for the user to the third content item includes:
    providing the system key from an analytics engine to the electronic content management system; and
    receiving, from the electronic content management system, the third content item for presenting to the user.

6. The method as in claim 1, further comprising:
receiving a request from a user to access an analytics engine, the request including verification information associated with the user; and
verifying, by the analytics engine, the user's verification information.

7. The method of claim 6, wherein requesting access for the user to the one or more content items from the electronic content management system includes:
    transmitting, from the analytics engine to the electronic content management system, the user's verification information;
    verifying, at the electronic content management system, user privileges associated with the user based on the user's verification information; and
    transmitting, from the electronic content management system to the analytics engine, the third link, in response to verifying that the user has required privileges to access the third content items.

8. A system comprising:
one or more physical processors; and
at least one memory configured to store computer-readable instructions, which, when executed by the one or more physical processor, cause the one or more physical processors to perform one or more operations, the operations comprising:
receiving a request from a user to access a report associated with one or more content items maintained by an electronic content management system, the requested report being generated, in response to determining that the user has access permission to the requested report, the requested report including of a first link, a second link, and a third link to of a first content item, a second content item, and a third content item;

presenting the first content item to the user, in response to determining that the first content item is freely sharable;

denying the user from accessing the second content item, in response to determining that the second content item is confidential; and in response to determining that the third content is neither freely sharable nor confidential, dynamically determining user permissions associated with the user based on matching a system key included in the third link with content of a permission log, the permission loci including user content access rights data and business process application (BPA) data, wherein the BPA data defines functionality for guiding the user through a set of actions consistent with completion of an instance of a business process.

\* \* \* \* \*